United States Patent
Wu et al.

(10) Patent No.: US 9,605,976 B2
(45) Date of Patent: Mar. 28, 2017

(54) MULTI-TIER LIMIT-ANGLE PROTECTION DEVICE

(71) Applicant: NATIONAL CHUNG SHAN INSTITUTE OF SCIENCE AND TECHNOLOGY, Longtan Township (TW)

(72) Inventors: Ruh-Hua Wu, Longtan Township (TW); Chung-Tseng Chang, Bade (TW)

(73) Assignee: NATIONAL CHUNG SHAN INSTITUTE OF SCIENCE AND TECHNOLOGY (TW)

( * ) Notice: Subject to any disclaimer, the term of this patent is extended or adjusted under 35 U.S.C. 154(b) by 188 days.

(21) Appl. No.: 14/561,282

(22) Filed: Dec. 5, 2014

(65) Prior Publication Data

US 2016/0161287 A1    Jun. 9, 2016

(51) Int. Cl.
   *G01R 33/06*    (2006.01)
   *G01D 5/14*    (2006.01)

(52) U.S. Cl.
   CPC .................. *G01D 5/145* (2013.01)

(58) Field of Classification Search
   CPC ........ G01R 33/09; G01R 33/07; G01R 33/06; G01R 21/08; G01R 15/20
   See application file for complete search history.

(56) References Cited

U.S. PATENT DOCUMENTS

| | | | |
|---|---|---|---|
| 7,073,398 B2 * | 7/2006 | Kondo | B62D 15/02 73/862.326 |
| 7,112,962 B2 * | 9/2006 | Ricks | G01R 33/09 324/207.25 |
| 2004/0017187 A1 | 1/2004 | Van Ostrand | |
| 2015/0338473 A1 * | 11/2015 | Diaconu | G01R 33/0029 324/251 |

* cited by examiner

*Primary Examiner* — Jermele M Hollington
*Assistant Examiner* — Feba Pothen
(74) *Attorney, Agent, or Firm* — Schmeiser, Olsen & Watts, LLP (57) ABSTRACT

A multi-tier limit-angle protection device detects a rotation angle about a rotation axis of a driving apparatus to thereby control the operation of a driving motor of the driving apparatus. The multi-tier limit-angle protection device includes a first-axis potentiometer for generating a first-axis sensing signal, a first-axis limit-angle detecting module for generating a first-axis confirming signal, and a controller. The controller effectuates a first tier protection mechanism by determining whether a limit angle of the rotation axis is exceeded according to the first-axis sensing signal, effectuates a second tier protection mechanism by determining whether the first-axis potentiometer is operating well according to a first-axis confirming signal, and effectuates a third tier protection mechanism through its control over the driving motor. The multi-tier limit-angle protection device features integration of software and hardware to thereby preclude mechanism complexity and provide a multi-tier limit-angle protection mechanism.

8 Claims, 7 Drawing Sheets

MULTI-TIER LIMIT-ANGLE PROTECTION DEVICE

FIELD OF TECHNOLOGY

The present invention relates to multi-tier limit-angle protection devices, and more particularly, to a limit-angle protection device for use with a rotation mechanism with limited stroke to prevent a driven apparatus from suffering damage which might otherwise happen if the angle of rotation of the mechanism exceeds the limit.

BACKGROUND

A rotation mechanism with limited stroke usually operates in conjunction with a limit-angle protection device to prevent a driven apparatus from suffering damage which might otherwise happen if the angle of rotation of the mechanism exceeds the limit. Although a conventional mechanical stopper puts a restraint on the angle of rotation of the mechanism, it is incapable of protective power interruption, thereby causing damage to the mechanism or overloading the device under an overly large driving force.

A conventional limit switch applies to the installation of a rotation mechanism. Once it approaches an angular limit, the rotation mechanism will trigger a lever of the limit switch in breaking the circuit of the rotation mechanism such that the rotation mechanism will stop operating. In general, the modes in which the limit switch operates come in various forms, including a mechanical mode, an electromagnetic code, and an optical mode. Regardless of which mode the limit switch is operating, the limit switch must operate in conjunction with the rotation mechanism, or, to be specific, must come into contact with the rotation mechanism in order to trigger the lever of the limit switch as soon as the rotation mechanism attains a rotational limit-angle.

US20040017187 discloses a sensor of rotational or linear displacement. The sensor comprises magnetic blocks and a magnetic field detection circuit, wherein the angular or linear displacement is determined in accordance with a sinusoidal wave generated from two linear Hall elements (LHE), and the sinusoidal wave features a phase difference of 90 degrees. However, US20040017187 also discloses that the magnetic blocks take on a special shape in order for the linear Hall elements to produce a magnetic field which manifests a position-dependent linear relationship. But the special shape of the magnetic blocks has the following disadvantages: since the journey of the displacement of the magnetic blocks correlates with the size of the magnetic blocks, given a constant installation space, the larger the magnetic blocks, the less the remaining displacement; to achieve a relatively large range of motion, the required volume of the device must increase; what is more, US20040017187 discloses just a single limit-angle surveillance mechanism and thus still has room for improvement in security.

SUMMARY

It is an objective of the present invention to replace a conventional contact-based limit switch with a non-contact magnetic induction mechanism so as to preclude complexity in mechanism design.

Another objective of the present invention is to adjust limit-angle by software so as to preclude any problem with an intricate loop.

Yet another objective of the present invention is to provide a sophisticated limit-angle protection mechanism capable of carrying out at least two protection processes so as to provide secure and stable protection.

In order to achieve the above and other objectives, the present invention provides a multi-tier limit-angle protection device, adapted to detect a rotation angle about a rotation axis of a driving apparatus to thereby control operation of a driving motor of the driving apparatus, the multi-tier limit-angle protection device comprising: a first-axis potentiometer comprising two magnetic sensing elements and a first magnetic block, with the two magnetic sensing elements spaced apart by a first predefined angle centered at a first axis of the driving apparatus, wherein a direction of magnetization of the first magnetic block is perpendicular to the first axis so as for a first-axis sensing signal to be generated in accordance with an output of a variation in a strength of magnetic field induction of the first magnetic block relative to the first-axis potentiometer; a first-axis limit-angle detecting module comprising two magnetic sensing elements, two switch circuits, and three second magnetic blocks, with the second magnetic blocks disposed at positive and negative limit angles and the zero point of the first-axis rotation angle of the driving apparatus, respectively, wherein the two magnetic sensing elements connected to the digital switch circuits are disposed at the positive and negative limit angles, respectively, so as to output a plurality of first-axis confirming signals in accordance with magnetic field induction of the second magnetic blocks; and a controller connected to the first-axis potentiometer, the first-axis limit-angle detecting module, and the driving apparatus and adapted to receive the first-axis sensing signal so as to determine a rotation angle about the first axis of the driving apparatus, such that operation of a first-axis driving motor of the driving apparatus stops as soon as the rotation angle about the first axis exceeds a limit angle, wherein the controller receives the first-axis confirming signals, such that the rotation angle about the first axis is determined, and a negative determination causes the first-axis driving motor of the driving apparatus to stop operating, wherein, from the perspective of the magnetic sensing element-facing sides of the second magnetic blocks, one of the second magnetic blocks is disposed at the zero point of the rotation angle, whereas the other two second magnetic blocks are disposed at the positive and negative limit-angles of the rotation angle, respectively, and have opposite magnetic poles facing the magnetic sensing elements.

In order to achieve the above and other objectives, the present invention further provides a multi-tier limit-angle protection device, wherein an output of two switch circuits of the first-axis limit-angle detecting module is connected to the first-axis driving motor, wherein a limit angle of the first axis of the driving apparatus is less than 180 degrees, wherein the first-axis driving motor stops operating because a voltage level variation arises from the first-axis confirming signal when the rotation angle about the first axis exceeds a limit angle.

In an embodiment of the present invention, the multi-tier limit-angle protection device further comprises a second-axis potentiometer and a second-axis limit-angle detecting module. The controller s connected to the second-axis potentiometer, the second-axis limit-angle detecting module, and the driving apparatus. The controller receives the second-axis sensing signal so as to determine a rotation angle about the second axis of the driving apparatus, such that operation of a second-axis driving motor of the driving apparatus stops as soon as the rotation angle about the second axis exceeds a limit angle, wherein the controller receives the second-axis confirming signals, such that the rotation angle about the second axis is determined, and a negative determination causes the second-axis driving motor of the driving apparatus to stop operating.

In an embodiment of the present invention, the magnetic sensing elements are Hall effect sensing elements, and the switch circuits are Schmitt trigger circuits.

In an embodiment of the present invention, the first-axis driving motor comprises a first-axis Hall sensing and decoding chip and a first-axis motor driving chip, an output of the two switch circuits of the first-axis limit-angle detecting module is connected to the first-axis Hall sensing and decoding chip.

In an embodiment of the present invention, the first magnetic block of the first-axis potentiometer is fixed to the first axis, the first magnetic block of the second-axis potentiometer is fixed to the second axis, the second magnetic blocks of the first-axis limit-angle detecting module are fixed to the first axis, and the second magnetic blocks of the second-axis limit-angle detecting module are fixed to the second axis.

In an embodiment of the present invention, the first axis is an EL axis with changed angle of elevation and angle of depression, and the second axis is an AZ axis with a changed azimuth angle.

Accordingly, the present invention features software and hardware integration to thereby attain a multi-tier limit-angle protection mechanism, entails assessing the reliability of a potentiometer by means of two magnetic sensing elements disposed in a limit-angle detecting module, and involves integrating an analog magnetic field sensing chip (not equipped with any switch circuit) and a digital magnetic field sensing chip (equipped with a switch circuit) to thereby reduce mechanism complexity effectively, provide limit-angle protection, cut the costs incurred from parts and components, and enhance the reliability of products, thereby manifesting an inventive step over the prior art based on a conventional limit switch.

BRIEF DESCRIPTION

Objectives, features, and advantages of the present invention are hereunder illustrated with specific embodiments in conjunction with the accompanying drawings, in which:

FIG. 2 (a) is a schematic view of a first-tier limit-angle protection mechanism according to an embodiment of the present invention;

FIG. 2 (b) is a waveform diagram of two magnetic sensing elements of a first-axis potentiometer according to an embodiment of the present invention;

FIG. 2 (c) is a schematic view of an output waveform of the two magnetic sensing elements of the first-axis potentiometer according to an embodiment of the present invention;

FIG. 3 (a) is a schematic view of a second-tier limit-angle protection mechanism according to an embodiment of the present invention;

FIG. 3 (b) is a schematic view of how the second-tier limit-angle protection mechanism operates according to an embodiment of the present invention;

DETAILED DESCRIPTION

Figure 1:
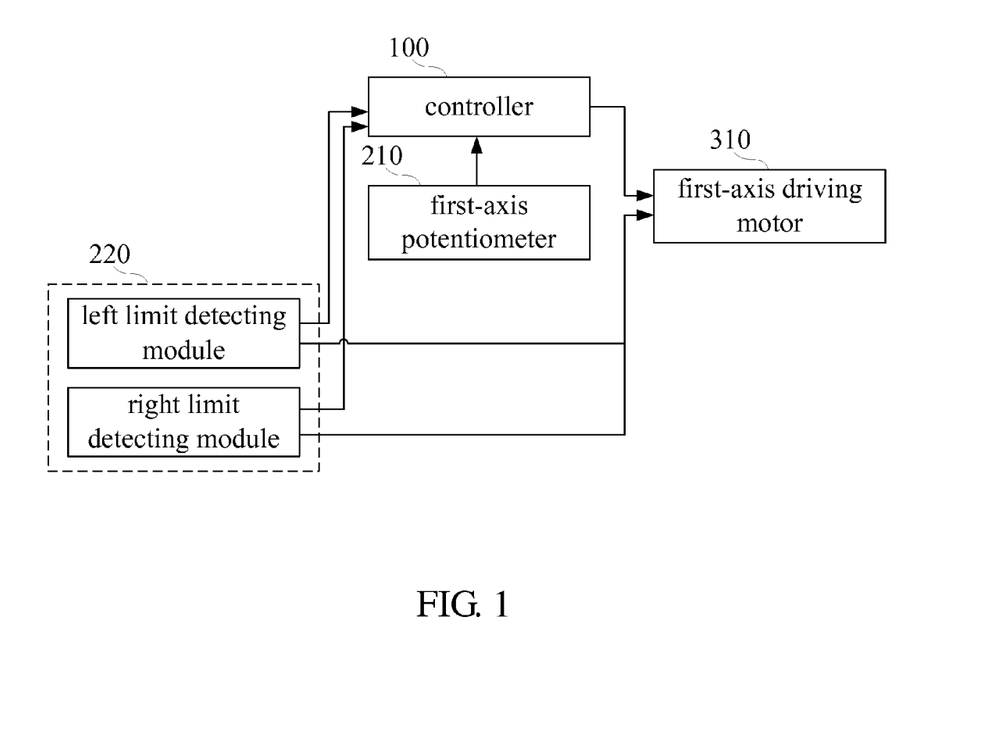
FIG. 1 is a function block diagram of a multi-tier limit-angle protection device according to an embodiment of the present invention.

Referring to FIG. 1, there is shown a function block diagram of a multi-tier limit-angle protection device according to an embodiment of the present invention. According to the present invention, in an embodiment, a multi-tier limit-angle protection device for detecting a rotation angle about a first axis of a driving apparatus comprises a first-axis potentiometer 210, a first-axis limit-angle detecting module 220, and a controller 100. The controller 100 controls the operation of a first-axis driving motor 310 of the driving apparatus. Examples of the controller 100 include a micro control unit (MCU) with a built-in single chip. The first-axis limit-angle detecting module 220 comprises a left limit detecting module and a right limit detecting module which are also known as limit-angle detecting modules and adapted to detect a positive limit-angle and a negative limit-angle, respectively.

Figure 2A:
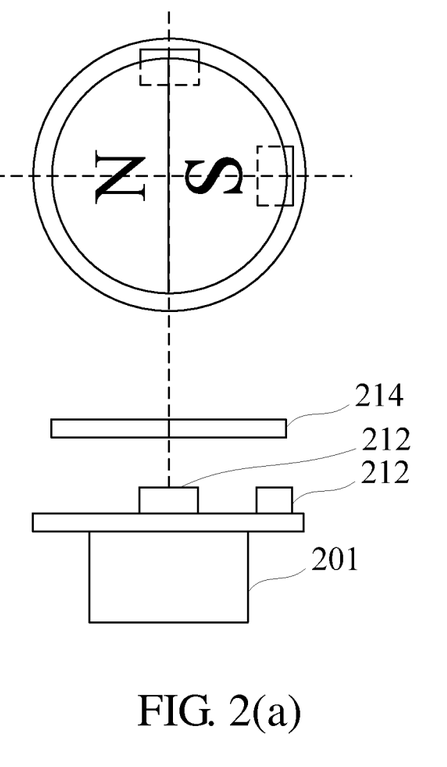

Referring to FIG. 2 (a), there is shown a schematic view of a first-tier limit-angle protection mechanism according to an embodiment of the present invention. FIG. 2 (a) further includes a side view and a top view. The first-axis potentiometer 210 comprises two magnetic sensing elements 212 and a first magnetic block 214. The two magnetic sensing elements 212 are spaced apart from each other by a first predefined angle centered at a first axis 201 of the driving apparatus. The direction of magnetization of the first magnetic block 214 is perpendicular to the first axis 201 so as for a first-axis sensing signal to be generated in accordance with the output of the variation in the strength of magnetic field induction of the first magnetic block 214 relative to the first-axis potentiometer 210.

Figure 2B:
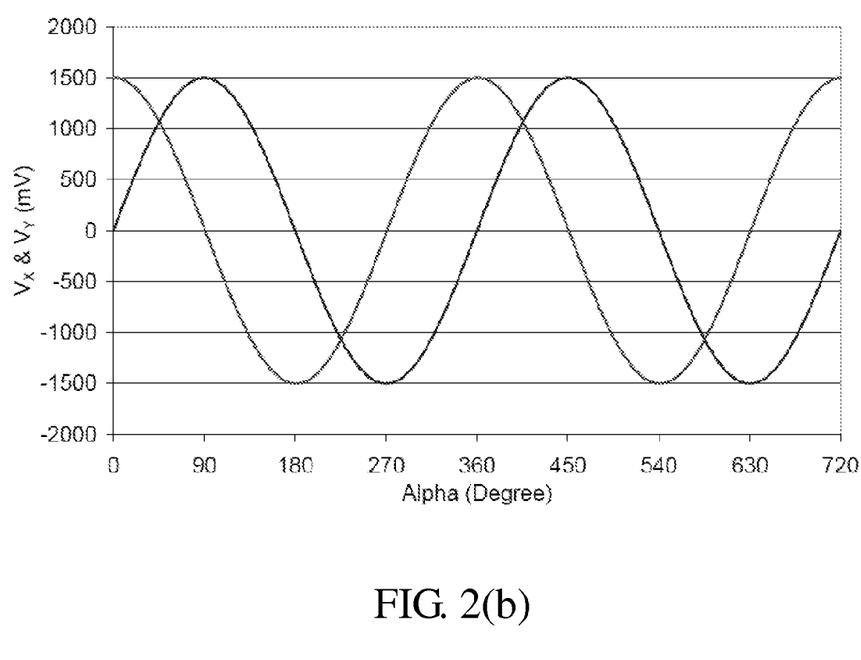
Figure 2C:
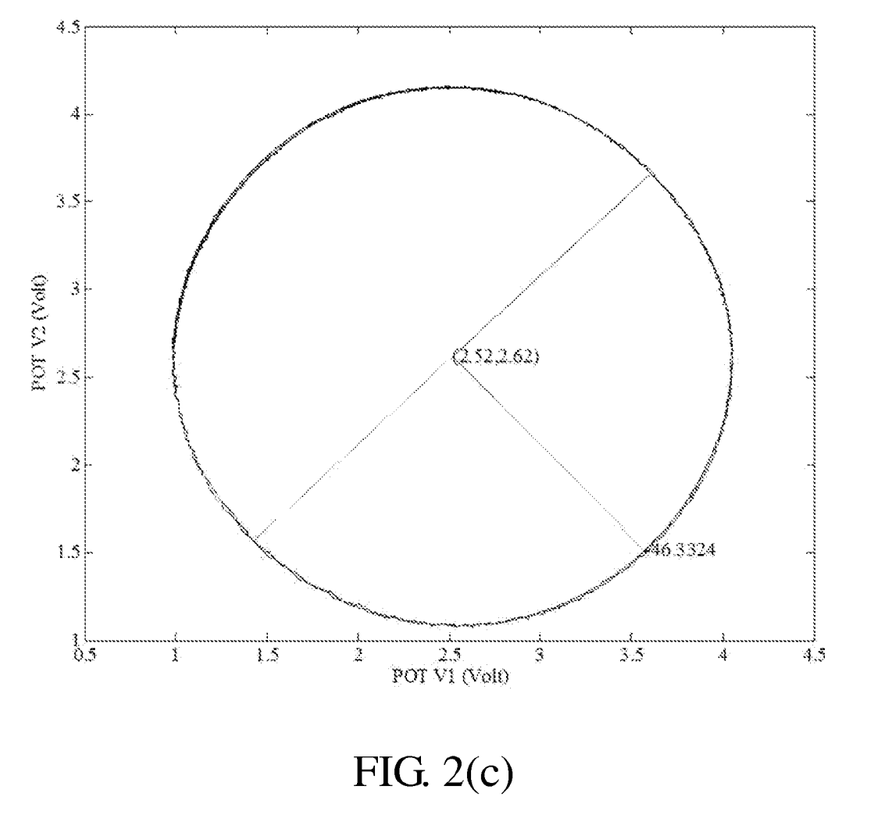

The first predefined angle is preferably 90 degrees. Referring to FIG. 2 (b), there is shown a waveform diagram of two magnetic sensing elements of a first-axis potentiometer according to an embodiment of the present invention. As shown in the diagram, the relationship between the output waveform of the two magnetic sensing elements 212 and the rotation angle about the first axis is close to that of sin/cos waves with a phase difference of 90 degrees. When the output signals from the two magnetic sensing elements 212 are seen as X axis and Y axis, respectively, their result approximates to a circle as shown in FIG. 2 (c), which is a schematic view of an output waveform of the two magnetic sensing elements of the first-axis potentiometer according to an embodiment of the present invention.

Hence, the output of the two magnetic sensing elements 212 follows a specific rule—given a cycle of 360 degrees, that is, the output voltages of the two magnetic sensing elements 212 correlates with each other. The present invention is advantageously characterized in that a table of the relationship between the output value of the two magnetic sensing elements 212 and the angle is created in advance and adapted to indicate the specific range within which the output of one of the magnetic sensing elements 212 falls by reading the voltage of the other one of the magnetic sensing elements 212. Hence, the controller 100 checks and determines whether output signals of the two magnetic sensing elements 212 are consistent with the table which is corrected in advance or whether errors in the output signals fall within an allowed range, so as to determine whether the first-axis potentiometer 210 is functioning well. In an embodiment of the present invention, the aforesaid technique is employed to determine whether hardware-related functions of a non-contact potentiometer work. If they work, the controller 100 will figure out the current rotation angle to thereby not only determine whether to stop the operation of the first-axis driving motor 310 of the driving apparatus, but also indicate a glitch in the potentiometer through a LED indicator.

In an embodiment of the present invention, the magnetic sensing elements 212 are exemplified by Hall effect sensing elements, such as linear Hall elements (LHE), and adapted to carry out non-contact sensing.

Although the multi-tier limit-angle protection device of the present invention provides the aforesaid first tier protection mechanism through the potentiometer, the demand for protection has not yet been fully met. Although it is feasible to fix the magnetic sensing elements 212 to the first axis 201 by adhesion or any other fastening means and fix the first-axis potentiometer 210 to the casing of a limit-angle protection device or any other mechanism, the odds are that the magnetic sensing elements 212 loosen after a long period of time of rotation and vibration of the first axis 201, thereby compromising the accuracy in the rotation angle figured out by the controller 100. To discover the aforesaid slack timely, the present invention further provides a second tier protection mechanism which involves checking and confirming whether the output of the first-axis potentiometer 210 is correct with the first-axis limit-angle detecting module 220.

Figure 3A:
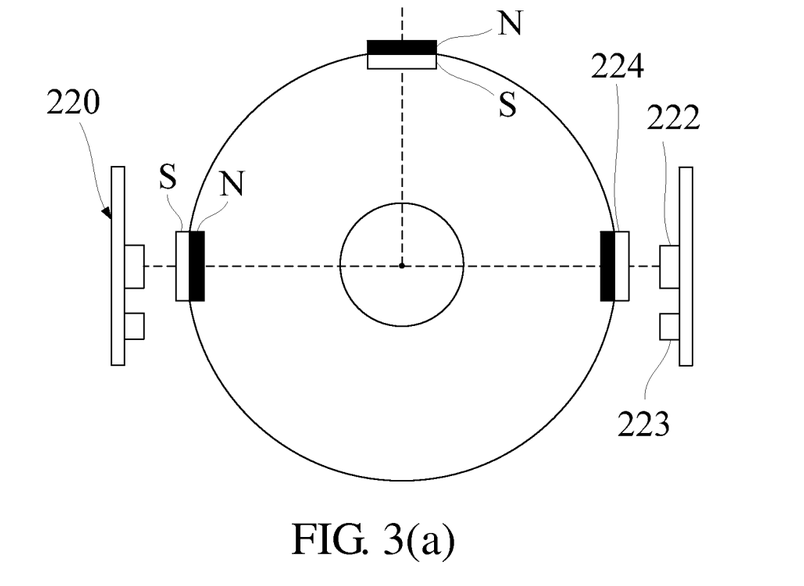

Referring to FIG. 3 (*a*), in an embodiment of the present invention, regarding the second tier protection mechanism, the first-axis limit-angle detecting module 220 comprises two magnetic sensing elements 222, two switch circuits 223, and three second magnetic blocks 224. The second magnetic blocks 224 are disposed at positive and negative limit angles and the zero point of the first-axis rotation angle of the driving apparatus, respectively. FIG. 3 (*a*) is exemplified by the positive and negative limit angles of ±90°. Moreover, the two magnetic sensing elements 222 connected to the digital switch circuits 223 are disposed at the positive and negative limit angles, respectively. One side of each of the second magnetic blocks 224 faces a corresponding one of the magnetic sensing elements 222; from the perspective of the magnetic sensing element-facing sides of the second magnetic blocks 224, one of the second magnetic blocks 224 is disposed at the zero point of the rotation angle, whereas the other two second magnetic blocks 224 are disposed at the positive and negative limit angles of the rotation angle, respectively, and have opposite magnetic poles facing the magnetic sensing elements 222. Referring to FIG. 3 (*a*), N-pole is distinguished from the S-pole by color. Similarly, the second magnetic blocks 224 are fixed to the first axis, whereas the first-axis limit-angle detecting module 220 is fixed to the casing of the limit-angle protection device or any other mechanism.

A first-axis confirming signal is generated as a result of magnetic field induction produced when the second magnetic blocks 224 rotate about the first axis and thus move pass the two magnetic sensing elements 222 from the front. As soon as the two magnetic sensing elements 222 produce magnetic field induction relative to the second magnetic blocks 224 passing in front of the two magnetic sensing elements 222, the two magnetic sensing elements 222 generate a first-axis confirming signal. Since the special magnetic arrangement of magnetic sensing element-facing sides of the second magnetic blocks 224 and the positions of the two magnetic sensing elements 222 are predefined, the different magnetic poles render it feasible to figure out a plurality of angles which meet the aforesaid requirement according to the positive and negative induction currents generated from the magnetic sensing elements 222, such that the controller 100 can carry out angle check and confirmation. Hence, given the first-axis limit-angle detecting module 220, when the first-axis rotation angle reaches a predefine angle, the controller 100 obtains a first-axis confirming signal to thereby check whether the first-axis sensing signal is obtained at the same angle. Referring to FIG. 3 (*a*), the first-axis confirming signal is obtained at 0°, 90°, 180°, 270°, and 360°, that is, at intervals of 90°.

In an embodiment of the present invention, the magnetic sensing elements 222 are exemplified by Hall effect sensing elements, such as linear Hall elements (LHE), and adapted to carry out non-contact sensing. The switch circuits 223 convert the output of the Hall effect sensing elements into a digital output. For instance, the switch circuits 223 are Schmitt trigger circuits. The Schmitt trigger circuits each have a built-in delay design for preventing the output from oscillating around the switching point between a high voltage and a low voltage. Moreover, the Schmitt trigger circuits are followed by a NPN transistor with an open collector or N-channel FET (NFET), such that it is feasible for the limit-angle detecting module to function as a device which satisfies a digital logic switch known as Hall-effect digital switch or Hall switch for enhancing its outputting capability.

The controller 100 obtains the rotation angle about the first axis at any time in accordance with the first-axis sensing signal and obtains the first-axis confirming signal at a specific angle so as to carry out the check and confirmation. That is to say, in the situation where only the first-axis sensing signal needs to be obtained by the controller 100, the controller 100 only carries out a surveillance process for checking whether the rotation angle exceeds a limit angle. In the situation where the controller 100 has to obtain both the first-axis sensing signal and the first-axis confirming signal, the controller 100 not only carries out the surveillance process for checking whether the rotation angle exceeds the limit angle, but also carries out an angle checking process. If one of the two processes yields a result of abnormality, it will be feasible to send an alert signal and stop the operation of the first-axis driving motor of the driving apparatus.

Figure 3B:
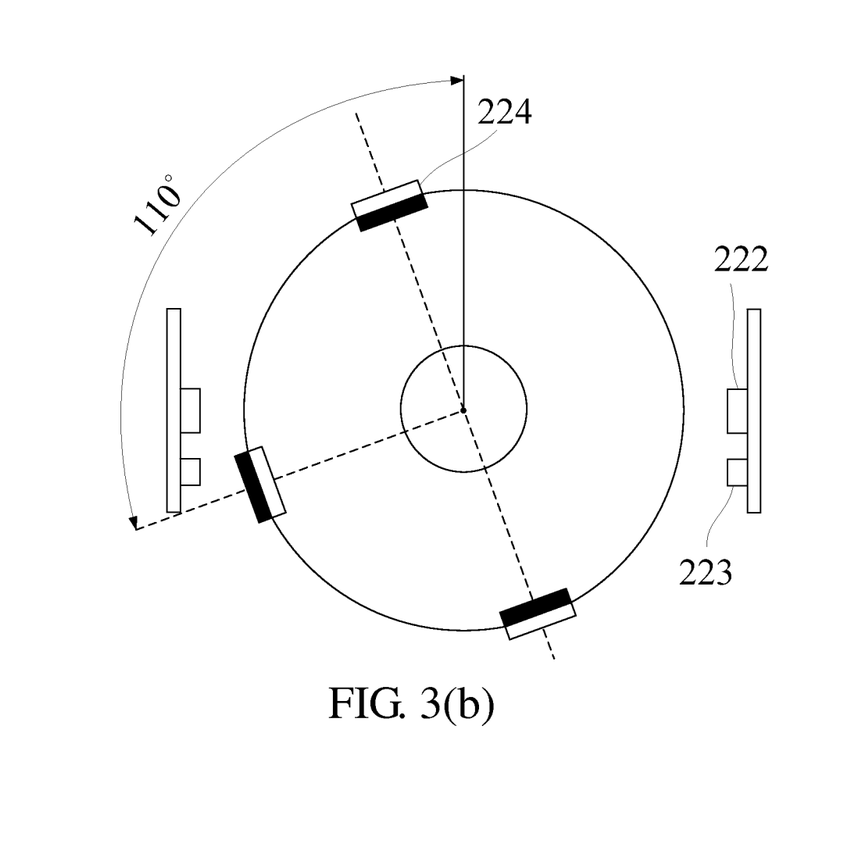
Figure 4:
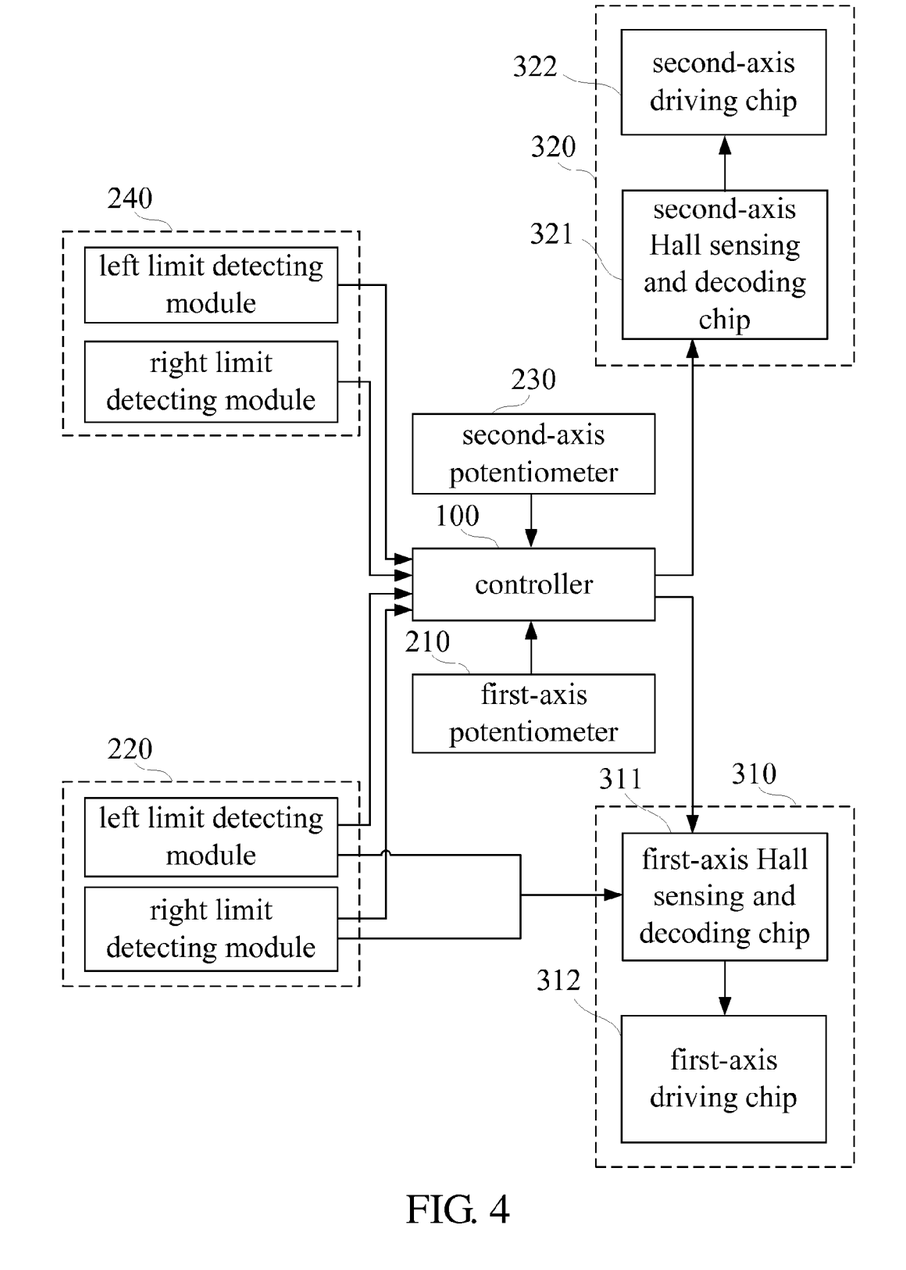
FIG. 4 is a function block diagram of a multi-tier limit-angle protection device according to another embodiment of the present invention.

Referring to FIG. 4, there is shown a function block diagram of a multi-tier limit-angle protection device according to another embodiment of the present invention. According to the present invention, in this embodiment, a three-tier protection mechanism is further provided to ensure that a limit-angle protection mechanism will operate even if the controller 100 breaks down. The three-tier protection mechanism is restricted to a limit angle of less than 180 degrees. The output of the two switch circuits 223 of the first-axis limit-angle detecting module 220 is connected to the first-axis driving motor 310; hence, when the rotation angle about the first-axis exceeds the limit angle, the voltage level variation arising from the first-axis confirming signal causes the first-axis driving motor to stop operating. The voltage level variation has another purpose: when the rotation angle about the first-axis exceeds the limit angle, the second magnetic blocks 224 with their N-poles facing the magnetic sensing elements 222 move and pass the magnetic sensing elements 222 to thereby cause a change in voltage level; hence, a first-axis Hall sensing and decoding chip 311 of the first-axis driving motor 310 stops the output of signals right away, such that a first-axis motor driving chip 312 at the back end stops the output of a driving signal, thereby stopping the operation of the first-axis driving motor 310. Referring to FIG. 3 (*b*), the first-axis rotation angle is as large as 110 degrees, and the second magnetic blocks 224 which are initially disposed at zero have already moved and passes a left limit detecting module disposed at the left limit angle; meanwhile, the first through third tier protection mechanisms stop the operation of the first-axis driving motor 310. Even if the first tier protection mechanism fails, the second tier protection mechanism will start to function. Even if the controller 100 fails, the third tier protection mechanism will start to function. Hence, multiple tier protection mechanisms are attained.

Figure 5:
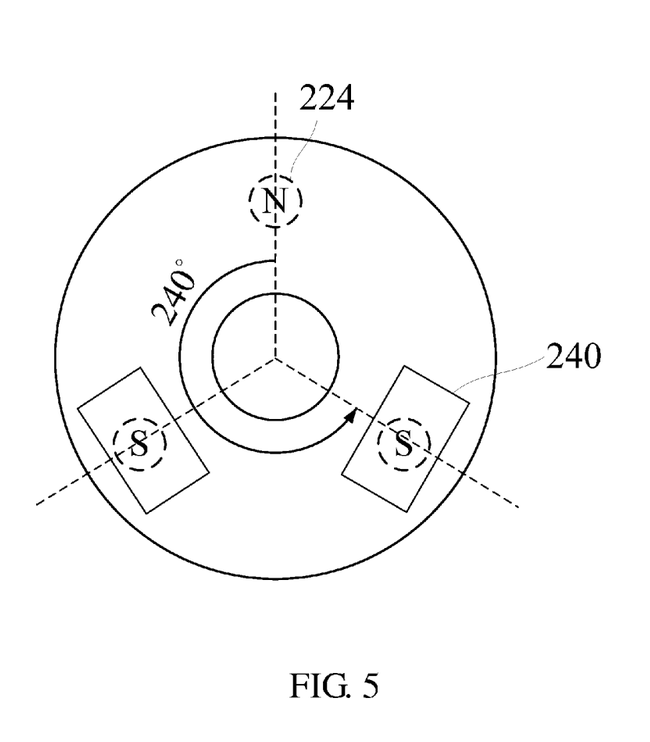
FIG. 5 is a schematic view of the second-tier limit-angle protection mechanism according to another embodiment of the present invention.

Referring to FIG. 4, with motion control usually including movement taking place in two axial directions, an embodiment of the present invention further involves applying an EL axis and an AZ axis to the second-axis protection mechanism, wherein the first axis is the EL axis with changed angle of elevation and angle of depression, and the second axis is the AZ axis with a changed azimuth angle. The second-axis protection device comprises a second-axis potentiometer 230, a second-axis limit-angle detecting module 240, a second-axis driving motor 320, a second-axis Hall sensing and decoding chip 321, and a second-axis motor driving chip 322. The aforesaid second-axis devices and modules are identical to their first-axis counterparts, except that the aforesaid second-axis devices and modules are configured to monitor the second axis. Referring to FIG. 5, the second axis (AZ axis) is monitored, though in a way slightly different from that of the first axis (EL axis), wherein the second-axis limit-angle detecting module 240 is disposed above the second magnetic blocks 224, whereas the second magnetic blocks 224 is disposed on a platform extended laterally from the second axis. Referring to FIG. 5, the limit angle is 240 degrees, for example. Since the AZ axis with a changed azimuth angle requires undergoing rotation by a large angle, the third-tier protection mechanism is preferably deployed at the EL axis with changed angle of elevation and angle of depression.

In conclusion, the embodiments of the present invention involves integrating an analog magnetic field sensing chip (not equipped with any switch circuit) and a digital magnetic field sensing chip (equipped with a switch circuit) to thereby reduce mechanism complexity effectively, provide limit-angle protection, cut the costs incurred from parts and components, and enhance the reliability of products.

Although the present invention is exemplified by a rotation mechanism to illustrate the principles and advantages of the present invention, the framework of the present invention applies to a linear sliding mechanism in practice. The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A multi-tier limit-angle protection device, adapted to detect a rotation angle about a rotation axis of a driving apparatus to thereby control operation of a driving motor of the driving apparatus, the multi-tier limit-angle protection device comprising:
    a first-axis potentiometer comprising a first magnetic sensing element and a second magnetic sensing element and a first magnetic block, with the first magnetic sensing element and the second magnetic sensing element spaced apart by a first predefined angle centered at a first axis of the driving apparatus, wherein a direction of magnetization of the first magnetic block is perpendicular to the first axis so as for a first-axis sensing signal to be generated in accordance with an output of a variation in a strength of magnetic field induction of the first magnetic block relative to the first-axis potentiometer;
    a first-axis limit-angle detecting module comprising a third magnetic sensing element and a fourth magnetic sensing element, a first switch circuit and a second switch circuit, and three second magnetic blocks, with the second magnetic blocks disposed at positive and negative limit angles and a zero point of the first-axis rotation angle of the driving apparatus, respectively, wherein the third magnetic sensing element and the fourth magnetic sensing element connected to the first switch circuit and the second switch circuit are disposed at the positive and negative limit angles, respectively, so as to output a plurality of first-axis confirming signals in accordance with magnetic field induction of the second magnetic blocks; and
    a controller connected to the first-axis potentiometer, the first-axis limit-angle detecting module, and the driving apparatus and adapted to receive the first-axis sensing signal so as to determine a rotation angle about the first axis of the driving apparatus, such that operation of a first-axis driving motor of the driving apparatus stops as soon as the rotation angle about the first axis exceeds a limit angle, wherein the controller receives the first-axis confirming signals, the first-axis driving motor of the driving apparatus stops operating whenever an angle at which one of the first-axis confirming signals is obtained does not equal the rotation angle about the first axis,
    wherein, from the perspective of the magnetic sensing element-facing sides of the second magnetic blocks, one of the second magnetic blocks which is disposed at the zero point of the rotation angle and the other two second magnetic blocks which are disposed at the positive and negative limit-angles of the rotation angle have opposite magnetic poles facing the magnetic sensing elements.

2. The multi-tier limit-angle protection device of claim 1, wherein an output of the first switch circuit and the second switch circuit of the first-axis limit-angle detecting module is connected to the first-axis driving motor, wherein the limit angle of the first axis of the driving apparatus is less than 180 degrees, wherein the first-axis driving motor stops operating because a voltage level variation arises from the first-axis confirming signal when the rotation angle about the first axis exceeds the limit angle.

3. The multi-tier limit-angle protection device of claim 2, further comprising:
    a second-axis potentiometer comprising a fifth magnetic sensing element and a sixth magnetic sensing element and a third magnetic block, with the fifth magnetic sensing element and the sixth sensing element spaced apart by a predefined angle centered at a second axis of the driving apparatus, wherein a direction of magnetization of the third magnetic block is perpendicular to the second axis, so as for a second-axis sensing signal to be generated in accordance with an output of a variation in a strength of magnetic field induction of the third magnetic block relative to the second-axis potentiometer; and
    a second-axis limit-angle detecting module comprising a seventh magnetic sensing element and an eighth magnetic sensing element, a third switch circuit and a fourth switch circuit, and three fourth magnetic blocks, with the fourth magnetic blocks disposed at positive and negative limit angles and a zero point of the second-axis rotation angle of the driving apparatus, respectively, wherein the seventh magnetic sensing element and the eighth magnetic sensing element connected to the third switch circuit and the fourth switch circuit are disposed at the positive and negative limit angles, respectively, so as to output a plurality of second-axis confirming signals in accordance with magnetic field induction of the fourth magnetic blocks, wherein the controller is connected to the second-axis potentiometer, the second-axis limit-angle detecting module, and the driving apparatus and adapted to receive the second-axis sensing signal so as to determine a rotation angle about the second axis of the driving apparatus, such that operation of a second-axis driving motor of the driving apparatus stops as soon as the rotation angle about the second axis exceeds a limit angle, wherein the controller receives the second-axis confirming signals, the first-axis driving motor of the driving apparatus stops operating whenever an angle at which one of the first-axis confirming signals is obtained does not equal the rotation angle about the first axis.

4. The multi-tier limit-angle protection device of claim 3, wherein the first magnetic sensing element and the second magnetic sensing element are Hall effect sensing elements, and the switch circuits are Schmitt trigger circuits.

5. The multi-tier limit-angle protection device of claim 4, wherein the first-axis driving motor comprises a first-axis Hall sensing and decoding chip and a first-axis motor driving chip, an output of the first switch circuit and the second switch circuit of the first-axis limit-angle detecting module is connected to the first-axis Hall sensing and decoding chip.

6. The multi-tier limit-angle protection device of claim 5, wherein the first magnetic block of the first-axis potentiometer is fixed to the first axis, the first magnetic block of the second-axis potentiometer is fixed to the second axis, the second magnetic blocks of the first-axis limit-angle detecting module are fixed to the first axis, and the fourth magnetic block of the second-axis limit-angle detecting module are fixed to the second axis.

7. The multi-tier limit-angle protection device of claim 6, wherein the first axis is an EL axis with changed angle of elevation and angle of depression, and the second axis is an AZ axis with a changed azimuth angle.

8. The multi-tier limit-angle protection device of claim 7, wherein the first predefined angle is 90 degrees.

* * * * *